Oct. 20, 1942.    P. S. LANE    2,299,399

PISTON RING

Filed Sept. 15, 1941

Inventor
Paul S. Lane
By Liverance and
Van Antwerp
Attorneys

Patented Oct. 20, 1942

2,299,399

UNITED STATES PATENT OFFICE 2,299,399

PISTON RING

Paul S. Lane, Muskegon, Mich., assignor to Muskegon Piston Ring Company, Muskegon, Mich., a corporation of Michigan Application September 15, 1941, Serial No. 410,819

2 Claims. (Cl. 309—45)

This invention relates to piston rings of the metallic type which are used in internal combustion engines. More particularly the invention relates to a new construction of piston ring adapted to be used in the oil grooves of pistons of an engine. It is an object and purpose of the present invention to provide a piston ring construction available for oil grooves of different widths in pistons and which is made of two parts, one of which alone may do oil sealing and oil removing from the walls of the piston and the other furnish ample drainage for the oil to the bottom of the ring groove and thence through passages in the wall of the piston to the interior thereof. Or in some instances both parts of the ring may engage against the cylinder wall for oil sealing and oil removal. The ring can be used with an expander spring located back of the parts thereof between the bottom of the ring groove and said piston ring parts, or it may be used without an expander.

An understanding of the invention may be had from the following description taken in connection with the accompanying drawing in which.

Like reference characters refer to like parts in the different figures of the drawing.

In the two part piston ring the upper part 1, preferably, of cast iron is parted at one side and normally is contracted to close the parting when in use in a piston ring groove and within an engine cylinder. Preferably, at its outer lower corner, it is provided with a continuous annular recess or groove 2 above which is an outwardly extending continuous rib 3 which has a substantially horizontal lower side providing the top of the groove 2, and a downwardly and outwardly inclined outer curved or conical surface 4. This ring part is to occupy the upper part of the ring groove.

Figure 1:
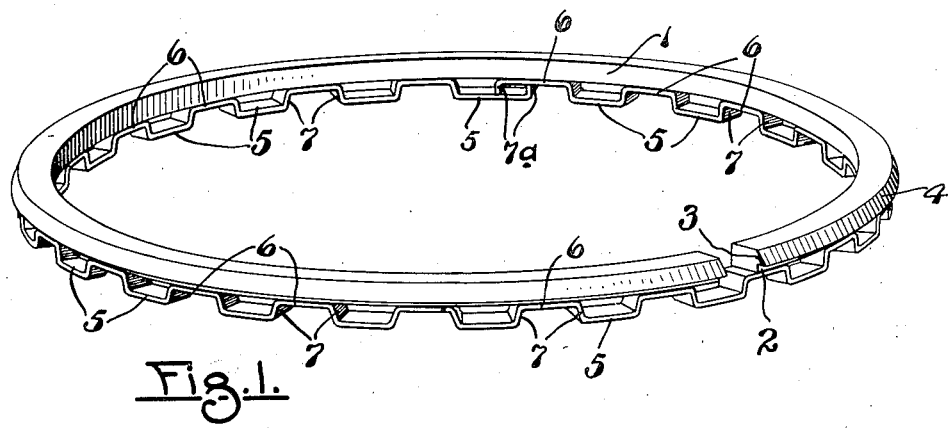
Fig. 1 is a perspective view of a piston ring made in accordance with my invention.

Associated and used with the upper ring part 1 is a lower ring part made from a single length of flat metal, usually though not necessarily steel, and shaped into a curved form and with alternate raises and depressions therein. The lower sides 5 occupy the same horizontal plane and the upper sides 6 similarly occupy the same horizontal plane spaced from the lower sides 5 and integrally connected by the slightly inclined sides 7, as shown. This ring is parted at one side, one upper side 6 extending over the terminal lip 7a turned upwardly from the adjacent lower side 5 and itself terminating in a downturned lip 7a which comes against the upper side of said adjacent parts 5 as shown in Fig. 1.

Figures 2, 3:
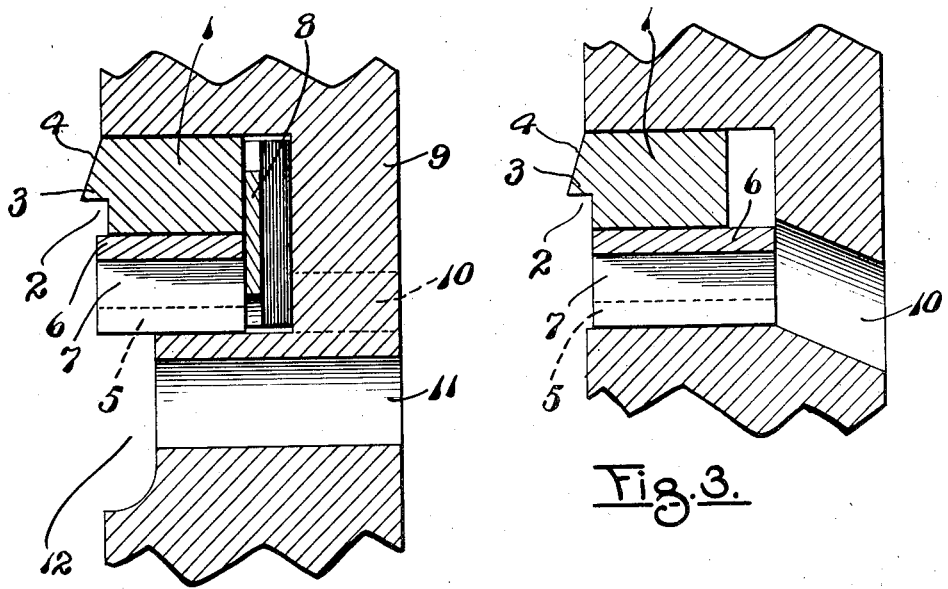
Fig. 2 is an enlarged transverse section through the piston ring in a groove in a piston, the wall of which is shown fragmentarily and with an expander in the groove.
Fig. 3 is a view similar to Fig. 2 showing a different form or embodiment of the invention.

When the ring is installed in a groove, as in Fig. 2, the combined axial width of the two ring members is such as to cause a substantial filling of the groove. In said construction shown in Fig. 2 an expander spring 8 of conventional structure is located in the bottom of the groove in the piston 9. The piston may be provided with oil drainage openings indicated in dotted lines at 10 leading from the bottom of the groove to the interior of the piston, or below the ring groove there may be oil passages as at 11, the piston being cut away and grooved at its outer surface as at 12, the piston ring at its outer portion extending over said groove 12. In such case the inner curved edges of the upper and lower ring members are flush with each other and are pressed against by the expander 8.

In Fig. 3 the lower ring member is of greater radial depth than the upper member 1 and has but slightly less radial depth than the depth of the ring groove. The upper ring member 1 is shown as without an expander back of it, normally tending to spring outward by reason of inherent tension in the ring member caused by substantially closing it at its parting.

It will be evident from the disclosure made that a large oil drainage is provided by the lower ring member or filler, oil passing between the bottom of the ring member and the lower parts 5 of the filler member, and also between the upper parts 6 of the filler member and the bottom of the ring groove into the oil draining passages 10 in the piston. With the construction shown in Fig. 3 the cast iron upper ring member 1 engages against the cylinder wall and oil is scraped on the down stroke of the piston from the walls of the cylinder to the entrances of the passages through the lower filler member. In the construction shown in Fig. 2 initially the upper ring member will engage the cylinder walls but shortly after the ring has been installed and the outer sharp corner worn both the upper ring member and the filler will engage the cylinder wall for sealing purposes and for oil removal either to pass outwardly through drainage openings at 10 leading from the ring groove or through the openings 11 below the ring groove.

This construction of ring has proven very practical and useful in tests and in service. The filler member may be made with different axial dimensions and in grooves of different widths thus used with the cast iron upper ring members all of which may be of the same axial dimension. In all cases the lower wrought metal filler member which in practice may best be made of steel provides passages or ventilation for the oil to pass through to the bottom or back of the ring groove. The cast iron upper ring members also may be made of different axial widths so that a desired cast iron section of the required thickness or axial dimension may be selected for pistons having grooves of same axial dimensions. In the form shown in Fig. 3 it is evident that narrow cast iron rings may be used in a relatively wide groove the lower wrought iron ring member partly filling the groove and at the same time providing oil passage or ventilation. In such form of construction shown in Fig. 3 the lower member will have no inherent tension but in other forms particularly where no expander is used it is made so as to be contracted when placed within an engine cylinder to provide the necessary tension.

The invention is defined in the appended claims and is to be considered comprehensive of all forms of structure coming within their scope.

I claim:

1. A construction of the class described comprising, a parted expansible piston ring of substantially circular form and a parted filler of substantially circular form located below the piston ring, said filler being of thin ribbon-like material and having alternate upper and lower horizontal sections integrally connected at their ends providing radial oil passages through the filler between it and the lower side of the ring and between it and the lower side of the piston ring groove in which installed, said filler and ring having approximately equal vertical dimensions thereby providing maximum oil passage through the filler, and said piston ring at its cylinder bearing face having a continuous groove at its lower outer corner above which is an annular projecting rib, the under side of which is in a plane substantially parallel to the flat sides of the ring and the outer side of which extends downwardly and outwardly to meet said under side at a point, and said filler at its outer curved portion extending beyond the lower side of the ring but not as far as said outer pointed portion of said annular rib.

2. A construction of the class described comprising, a parted expansible piston ring of substantially circular form and a parted filler of substantially circular form located below the piston ring, said filler being of thin ribbon like material and having upper and lower substantially horizontal sections integrally connected at their ends providing radial oil passages through the filler between it and the lower side of the piston ring groove in which installed, said filler and ring having approximately equal vertical dimensions thereby providing maximum oil passage through the filler and said piston ring at its cylinder bearing face having a continuous groove at its lower outer corner above which is an annular projecting rib, the under side of which is in a plane substantially parallel to the flat sides of the ring, said projection at its outer side extending beyond the outer curved portion of the filler and said filler at its outer curved portion extending beyond the lower side of the ring.

PAUL S. LANE.